No. 752,606. PATENTED FEB. 16, 1904.
C. F. THOMPSON.
TEMPLE FOR LOOMS.
APPLICATION FILED OCT. 12, 1903.
NO MODEL.
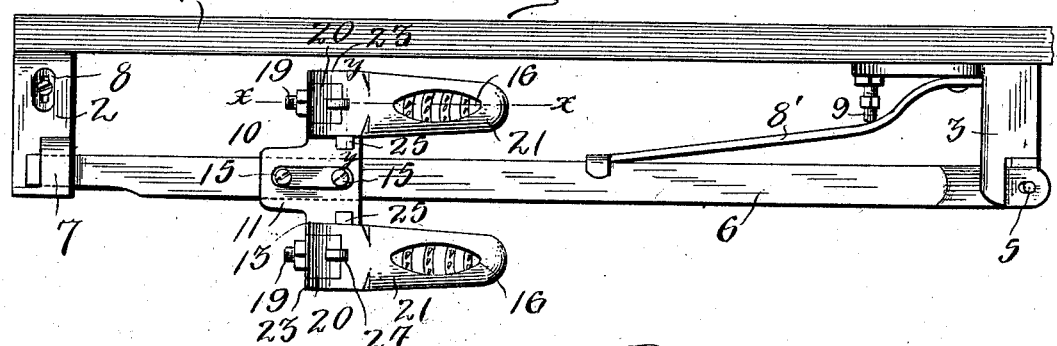
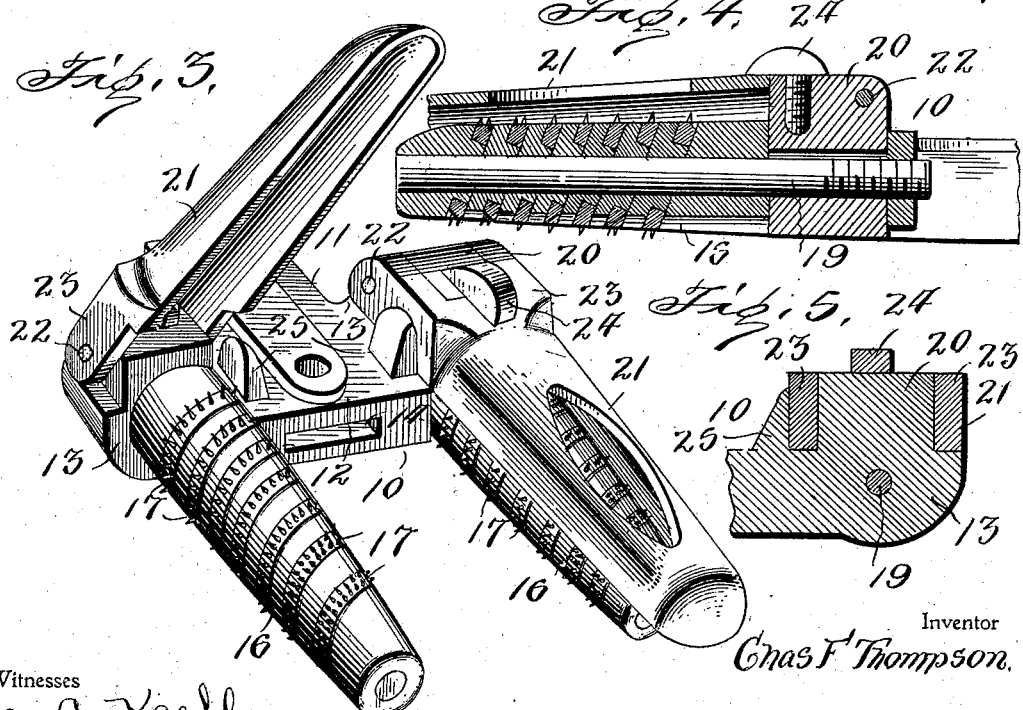
Witnesses
Inventor
Chas F Thompson.
By H. B. Willson,
Attorney No. 752,606. Patented February 16, 1904.

UNITED STATES PATENT OFFICE.

CHARLES F. THOMPSON, OF FULTON, NEW YORK.

TEMPLE FOR LOOMS.

SPECIFICATION forming part of Letters Patent No. 752,606, dated February 16, 1904.

Application filed October 12, 1903. Serial No. 176,730. (No model.)

*To all whom it may concern:*

Be it known that I, CHARLES F. THOMPSON, a citizen of the United States, residing at Fulton, in the county of Oswego and State of New York, have invented certain new and useful Improvements in Temples for Looms; and I do declare the following to be a full, clear, and exact description of the invention, such as will enable others skilled in the art to which it appertains to make and use the same.

My invention relates to new and useful improvements in temples for looms.

The object of my invention is to overcome the liability of the temples cutting the filling or chafing the warp, especially on very heavy weaves, and this object I accomplish by using two temples or a double temple, as hereinafter described, which I find will so equalize and distribute the strain upon the temple that the cloth will be properly held, so all danger of the temples cutting the same is overcome.

A further object of the invention is to provide a double temple of this character which will be simple in construction, durable in use, and very efficient for the purpose intended.

With these and other objects in view the invention consists of certain novel features of construction, combination, and arrangement of parts, as will be more fully described, and particularly pointed out in the appended claims.

In the accompanying drawings, Figure 1 is a top plan view of a portion of the breast-beam of a loom, the spring-supporting bar attached thereto, and my improved double temple upon said supporting-bar. Fig. 2 is a side elevation of the parts shown in Fig. 1. Fig. 3 is a perspective view of the double temple removed from its supporting-bar, one of the temple roller casings or pods being in its opened position. Figs. 4 and 5 are sectional views taken, respectively, on the lines $x\,x$ and $y\,y$ of Fig. 1.

Referring to the drawings by numerals, 1 denotes a portion of the breast-beam of a loom, to which L-shaped brackets 2 and 3 are bolted, as at 4, to permit them to be adjusted vertically upon said beam. The horizontal arm of bracket 3 has a stud 5, upon which one end of a temple-supporting bar 6 is pivoted. The opposite end of said bar 6 is detachably engaged with a stop-plate 7, adjustably secured, as at 8, upon the top of the horizontal arm of the bracket 2. The plate 7 is adjustable laterally and limits the movement of the bar 6 in one direction. A flat spring 8', attached to the bracket 3 and adjusted by a tension-screw 9, holds said bar against the stop-plate 7, as shown.

Slidably and adjustably mounted on the supporting-bar 6 is my improved double temple 10, which comprises a block 11, having a central portion 12 with lateral projections or enlargements 13 upon each side. The body portion 12 of the temple-block 11 is formed with a slot 14, through which the bar 6 projects, and said block is held upon said bar in any adjusted position by set-screws 15. Temple-rollers 16 are attached to each of said projections 13 and are composed of series of rings 17, rotatably mounted at an oblique angle upon tapered or cone-shaped cylinders 18, which are secured upon the projections 13 by bolts 19, as shown. Upon reduced upper portions 20 of the projections 13 are hingedly secured roller-casings 21, which are adapted to hold the cloth upon the rollers, as is well known. Said casings are pivotally or hingedly secured by passing pins 32 through ears 23, formed at the ends of the casings and engaging opposite sides of the reduced portions 20 of the projections 13. The under sides of said ears engage the upper surfaces of the projections 13 and limit the downward movement of the casings. Said casings are held in their lowered position over the rollers by catches 24, pivoted upon the tops of the reduced portions 20 and adapted to be swung over the tops of the casings, as shown. In order to guide the casings in their swinging movements and to prevent any looseness of their connections, lugs 25 are formed on the upper surfaces of the projections 13 and are adapted to engage the ears 23, as shown.

The operation and advantages of my invention will be readily understood from the foregoing description, taken in connection with the accompanying drawings. It will be seen that by employing two temples, one upon each side of the bar 6, the strain upon them will be equally distributed and the cloth will be so held that all liability of the rollers cutting the same is overcome.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In a temple for looms, the combination with a supporting-bar, of a block longitudinally adjustable upon said bar, lateral projections upon each side of said block, and a temple-roller mounted upon each of said projections.

2. In a temple for looms, the combination with a supporting-bar, of a block slidable longitudinally upon said bar, means for securing said block in an adjusted position, lateral projections upon opposite sides of said block, and a temple-roller journaled upon each of said projections, substantially as described.

3. In a temple for looms, the combination with a supporting-bar, of a block slidably mounted upon said bar having a longitudinally-disposed central opening to receive said bar and lateral projections upon each side of said block, a set-screw for securing said sliding block upon said bar, and a temple-roller journaled upon each of said projections, substantially as described.

4. In a temple for looms, the combination with a supporting-bar, a block slidably and adjustably mounted upon said bar, lateral projections upon each side of said block having reduced upper ends, temple-rollers mounted upon said blocks, casings for said rollers hingedly connected to the reduced upper portions of said projections, and lugs upon said block adapted to guide said casing, substantially as described.

In testimony whereof I have hereunto set my hand in presence of two subscribing witnesses.

CHARLES F. THOMPSON.

Witnesses:
　JAMES BRIGGS,
　GEORGE S. PRESTON.